(12) United States Patent
Yang (10) Patent No.: US 10,902,283 B2
(45) Date of Patent: Jan. 26, 2021

(54) METHOD AND DEVICE FOR DETERMINING HANDWRITING SIMILARITY

(71) Applicant: BOE TECHNOLOGY GROUP CO., LTD., Beijing (CN)

(72) Inventor: Yonggui Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 48 days.

(21) Appl. No.: 16/422,849

(22) Filed: May 24, 2019

(65) Prior Publication Data

US 2020/0167596 A1 May 28, 2020

(30) Foreign Application Priority Data

Nov. 22, 2018 (CN) .......................... 2018 1 1400058

(51) Int. Cl.
*G06K 9/62* (2006.01)
*G06K 9/20* (2006.01)
(Continued)

(52) U.S. Cl.
CPC ......... *G06K 9/6215* (2013.01); *G06K 9/2054* (2013.01); *G06K 9/3275* (2013.01);
(Continued)

(58) Field of Classification Search
CPC ......... G06T 5/002; G06T 5/30; G06K 9/6202; G06K 9/3275; G06K 9/6215; G06K 9/2054; G06K 9/38; G06K 9/48
See application file for complete search history.

(56) References Cited

U.S. PATENT DOCUMENTS

2018/0293908 A1 10/2018 Wang

FOREIGN PATENT DOCUMENTS

CN 101393645 A 3/2009
CN 101393693 A 3/2009
(Continued)

OTHER PUBLICATIONS

First Chinese Office Action dated Apr. 24, 2020, recieved for corresponding Chinese Application No. 201811400058.X, 23 pages.
(Continued)

*Primary Examiner* — Brenda C Bernardi
(74) *Attorney, Agent, or Firm* — Kinney & Lange, P.A.

(57) ABSTRACT

The present disclosure provides a method and device for determining a handwriting similarity. The method includes: performing image processing on a handwriting image comprising a handwriting to be compared to obtain a first processed image and a second processed image having different handwriting features of the handwriting image; determining, based on the first processed image, a first feature vector indicating at least one first handwriting feature of the handwriting to be compared; determining, based on the second processed image, a second feature vector indicating at least one second handwriting feature of the handwriting to be compared; determining a handwriting feature vector of the handwriting to be compared based at least on the first feature vector and the second feature vector; and determining a similarity between the handwriting to be compared and a reference handwriting based on the handwriting feature vector and a reference handwriting feature vector of the reference handwriting.

20 Claims, 5 Drawing Sheets

(51) Int. Cl.
  *G06K 9/32* (2006.01)
  *G06K 9/38* (2006.01)
  *G06K 9/48* (2006.01)
  *G06T 5/00* (2006.01)
  *G06T 5/30* (2006.01)

(52) U.S. Cl.
  CPC ............... *G06K 9/38* (2013.01); *G06K 9/48* (2013.01); *G06K 9/6202* (2013.01); *G06T 5/002* (2013.01); *G06T 5/30* (2013.01)

(56) References Cited

FOREIGN PATENT DOCUMENTS

| | | | |
|---|---|---|---|
| CN | 101561866 A | | 10/2009 |
| CN | 101847209 A | | 9/2010 |
| CN | 102842046 A | | 12/2012 |
| CN | 104715256 A | * | 6/2015 |
| CN | 106503694 A | | 3/2017 |
| CN | 107644006 A | | 1/2018 |
| CN | 108446701 A | | 8/2018 |
| EP | 3104305 A3 | | 3/2017 |

OTHER PUBLICATIONS

Xiang Shu-Zhen, Comprehensive Assessment on the Quality of Handwriting Features with Mahalanobis Distance, 3 pages, Tianjin Public Security Profession College, Tianjin 300382, China.

N.Y. Yu and S.H. Change, The Development of Computer-assisted Assessment in Chinese Handwriting Performance, 5 pages, Department of Physical Therapy, I-Shou university, Kaosiung County, Taiwan and Department of Occupational Therapy, I-Shou university, Kaosiung County, Taiwan.

Wang Jianping, Liu Xuejing, Chen Keqiong, Li Weitao, Offline Handwritten Chinese Character Intelligent Recognition with Variable Precision Feedback Mechanism, School of Electric Enginneering and Automation, Hefei University of technology, Hefei 230009, Anhui, China.

Sargur N. Srihari, Xuanshen Yang, Gregory R. Ball, Offline Chinese Handwriting Recognition: An Assessment of Current Technology, 19 pages, Center of Excellence for Document Analysis and Recognition (CEDAR), Dept of Computer Science and Engineering, University at Buffalo, State University of New York, Amherst, NY 14228.

* cited by examiner

METHOD AND DEVICE FOR DETERMINING HANDWRITING SIMILARITY

CROSS-REFERENCE TO RELATED APPLICATION(S)

The present application claims priority to the Chinese Patent Application CN201811400058.X, filed on Nov. 22, 2018, entitled "METHOD AND APPARATUS FOR DETERMINING QUALITY LEVEL OF WRITTEN FONTS", which is incorporated herein by reference in its entirety.

TECHNICAL FIELD

The present disclosure relates to the field of image processing technologies, and more particularly, to a method and device for determining a handwriting similarity.

BACKGROUND

Calligraphy is the cultural treasure of the Chinese nation. Calligraphy education has a subtle influence on the inheritance and development of Chinese excellent traditional culture and the cultivation of a younger generation with higher cultural quality. Many people need a lot of calligraphy practice to achieve desired effects because of their hobbies or professional needs. In real life, the most common way of calligraphy practice is copybook imitation on, for example, a paper, or imitation practice on an electronic writing screen.

However, in practical applications, many calligraphy practicers take practices in the absence of professional instructors after calligraphy classes, and therefore, it is often difficult for the calligraphy practicers to professionally determine whether they make standard writing, which may lead to repetition and ineffectiveness of the practices, and a waste of time and energy of the calligraphy practicers, thereby reducing the efficiency of the calligraphy practices.

SUMMARY

According to some embodiments of the present disclosure, there is proposed a computer implemented method for determining a handwriting similarity. The method comprises: performing image processing on a handwriting image comprising a handwriting to be compared to obtain a first processed image and a second processed image having different handwriting features of the handwriting image; determining, based on the first processed image, a first feature vector indicating at least one first handwriting feature of the handwriting to be compared; determining, based on the second processed image, a second feature vector indicating at least one second handwriting feature of the handwriting to be compared; determining a handwriting feature vector of the handwriting to be compared based on the first feature vector and the second feature vector at least; and determining a similarity between the handwriting to be compared and a reference handwriting based on the handwriting feature vector and a reference handwriting feature vector of the reference handwriting.

In some embodiments, the step of determining a similarity between the handwriting to be compared and a reference handwriting based on the handwriting feature vector and a reference handwriting feature vector of the reference handwriting comprises: determining a distance parameter between the handwriting feature vector and the reference handwriting feature vector; and determining the similarity between the handwriting to be compared and the reference handwriting based on the distance parameter.

In some embodiments, the distance parameter comprises a Euclidean distance or a Mahalanobis distance between the vectors.

In some embodiments, the reference handwriting feature vector of the reference handwriting is determined by performing image processing on the reference handwriting image comprising the reference handwriting to obtain a third processed image and a fourth processed image having different handwriting features of the reference handwriting image; determining, based on the third processed image, a third feature vector indicating a corresponding first handwriting feature of the reference handwriting; determining, based on the fourth processed image, a fourth feature vector indicating a corresponding second handwriting feature of the reference handwriting; and determining a reference handwriting feature vector of the reference handwriting based at least on the third feature vector and the fourth feature vector.

In some embodiments, the step of performing image processing on a handwriting image comprising a handwriting to be compared to obtain a first processed image and a second processed image having different handwriting features of the handwriting image comprise: converting the handwriting image into a corresponding binarized handwriting image; determining, in the binarized handwriting image, a quadrilateral region comprising the handwriting to be compared; performing perspective transformation on the quadrilateral region to obtain a corrected region; performing erosion processing on the corrected region to obtain the first processed image comprising a skeleton of the handwriting to be compared; and de-noising the corrected region to obtain the second processed image.

In some embodiments, the step of determining a handwriting feature vector of the handwriting to be compared based at least on the first feature vector and the second feature vector comprises: determining a weighted sum of the first feature vector and the second feature vector based on preset weights, as the handwriting feature vector.

In some embodiments, the first feature vector comprises at least one of an inner contour feature vector and a perimeter and area feature vector.

In some embodiments, the second feature vector comprises at least one of an outer contour feature vector and a style feature vector.

In some embodiments, the step of determining, based on the first processed image, a first feature vector indicating at least one first handwriting feature of the handwriting to be compared comprises at least one of: determining, from the first processed image, an area of a region between a first stroke and a second stroke in at least one preset direction as the inner contour feature vector; or determining a font contour perimeter and a font area of the first processed image to obtain the perimeter and area feature vector.

In some embodiments, the step of determining, based on the second processed image, a second feature vector indicating at least one second handwriting feature of the handwriting to be compared comprises at least one of: extracting a font style feature of the second processed image based on a convolutional neural network to obtain the style feature vector; or determining, from the second processed image, an area of a region between an edge of a first target corrected region and a first stroke in at least one of the preset directions to obtain the outer contour feature vector.

According to some other embodiments of the present disclosure, there is proposed a device for determining a handwriting similarity. The device comprises: a processor; and a memory having stored thereon instructions which, when executed by the processor, cause the processor to: perform image processing on a handwriting image comprising a handwriting to be compared to obtain a first processed image and a second processed image having different handwriting features of the handwriting image; determine, based on the first processed image, a first feature vector indicating at least one first handwriting feature of the handwriting to be compared; determine, based on the second processed image, a second feature vector indicating at least one second handwriting feature of the handwriting to be compared; determine a handwriting feature vector of the handwriting to be compared based on the first feature vector and the second feature vector at least; and determine a similarity between the handwriting to be compared and a reference handwriting based on the handwriting feature vector and a reference handwriting feature vector of the reference handwriting.

In some embodiments, the instructions which, when executed by the processor, further cause the processor to: determine a distance parameter between the handwriting feature vector and the reference handwriting feature vector; and determine the similarity between the handwriting to be compared and the reference handwriting based on the distance parameter.

In some embodiments, the distance parameter comprises a Euclidean distance or a Mahalanobis distance between the vectors.

In some embodiments, the instructions which, when executed by the processor, further cause the processor to: perform image processing on the reference handwriting image comprising the reference handwriting to obtain a third processed image and a fourth processed image having different handwriting features of the reference handwriting image; determine, based on the third processed image, a third feature vector indicating a corresponding first handwriting feature of the reference handwriting; determine, based on the fourth processed image, a fourth feature vector indicating a corresponding second handwriting feature of the reference handwriting; and determine a reference handwriting feature vector of the reference handwriting based at least on the third feature vector and the fourth feature vector.

In some embodiments, the instructions which, when executed by the processor, further cause the processor to: convert the handwriting image into a corresponding binarized handwriting image; determine, in the binarized handwriting image, a quadrilateral region comprising the handwriting to be compared; perform perspective transformation on the quadrilateral region to obtain a corrected region; perform erosion processing on the corrected region to obtain the first processed image comprising a skeleton of the handwriting to be compared; and de-noise the corrected region to obtain the second processed image.

In some embodiments, the instructions which, when executed by the processor, further cause the processor to: determine a weighted sum of the first feature vector and the second feature vector based on preset weights, as the handwriting feature vector.

In some embodiments, the first feature vector comprises at least one of an inner contour feature vector and a perimeter and area feature vector.

In some embodiments, the second feature vector comprises at least one of an outer contour feature vector and a style feature vector.

In some embodiments, the instructions which, when executed by the processor, further cause the processor to perform at least one of: determining, from the first processed image, an area of a region between a first stroke and a second stroke in at least one preset direction as the inner contour feature vector; or determining a font contour perimeter and a font area of the first processed image to obtain the perimeter and area feature vector.

According to still some other embodiments of the present disclosure, there is proposed a non-transitory computer readable storage medium. The computer readable storage medium has stored thereon a computer program which, when executed by a processor, implement the steps of the method described above.

BRIEF DESCRIPTION OF THE DRAWINGS

The above and/or other aspects, features and attendant advantages of the present disclosure will become more apparent and clear from the following detailed description in conjunction with the accompanying drawings. In the accompanying drawings, the same reference signs represent the same elements, and in the accompanying drawings.

DETAILED DESCRIPTION

In order to make the above purposes, features and advantages of the present disclosure more obvious and understandable, the present disclosure will be described in more detail below with reference to the accompanying drawings and specific implementations. Since various changes and many embodiments are allowed in the present disclosure, exemplary embodiments will be illustrated in the accompanying drawings and described in detail in the present disclosure. However, it is not intended to limit the present disclosure to the specific embodiments, and it is to be understood that the present disclosure covers all changes, equivalents and/or alternatives without departing from the spirit and scope of the present disclosure. In the present disclosure, certain detailed explanations in the related art are omitted when they are considered to unnecessarily obscure the substance of the present disclosure.

As used herein, singular forms "one", "an" and "the" may comprise plural referents, unless explicitly stated in the context. In the present disclosure, terms "comprises" or "configured to" etc. means that there are features, quantities, steps, operations, components, parts, or a combination thereof, but do not exclude the presence or addition of one or more features, quantities, steps, operations, components, parts or combination thereof.

In various exemplary embodiments of the present disclosure, terms such as "module," "unit," "part," etc. are terms used to designate a component which performs at least one function or operation. This component may be implemented as hardware, software, or any combination thereof. A plurality of "modules," "units," "parts," etc. may be integrated into at least one module or chip and implemented as at least one processor, which does not comprise a case where each of the "modules," "units," "parts," etc. must be implemented as a separate specific hardware.

Hereinafter, the present disclosure will be described in more detail with reference to the accompanying drawings. Exemplary embodiments of the present disclosure are illustrated in the accompanying drawings. However, the present disclosure may be embodied in many different forms and should not be construed as being limited to the exemplary embodiments set forth herein. On the contrary, these exemplary embodiments are provided to make the present disclosure comprehensive and complete, and convey the concept of the present disclosure to those of ordinary skill in the art. Further, when the present disclosure is described, a detailed description of related well-known functions or configurations which may obscure the substance of the present disclosure may be omitted.

It is to be illustrated that although a solution of determining a handwriting similarity according to an embodiment of the present disclosure is mainly described herein in an application scenario in which a quality level of a handwriting is determined relative to a standard font, the embodiment of the present disclosure is not limited thereto. In fact, in addition to determining the quality level of the handwriting by determining a similarity between the handwriting and the standard font, it is also possible to apply the solution according to the embodiment of the present disclosure to determining a similarity between the handwriting to be compared and any reference handwriting. For example, in a process of determining legality of a contract, the solution according to the embodiment of the present disclosure may be used to determine whether a handwriting of a signature on a dispute contract is written by oneself in person. In other words, the solution according to the embodiment of the present disclosure may be applied as long as there is a scenario in which a handwriting similarity needs to be determined.

Hereinafter, various exemplary embodiments of the present disclosure will be described in more detail with reference to the accompanying drawings.

Figure 1:
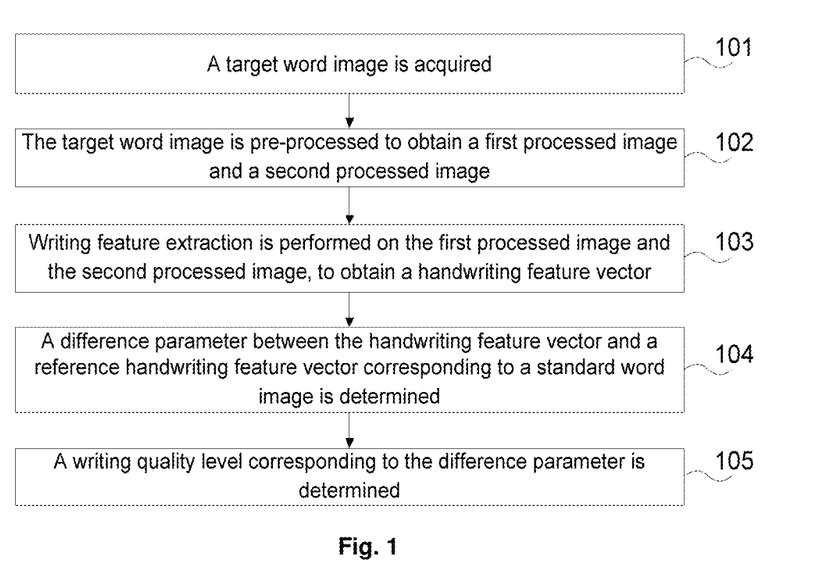
FIG. 1 illustrates a flowchart of steps of a method for determining a quality level of a written font according to an embodiment of the present disclosure.

As shown in FIG. 1, illustrated is a flowchart of steps of a method for determining a quality level of a written font based on a handwriting similarity according to some embodiments of the present disclosure. The method comprises the following steps.

In step 101, a target word image is acquired.

In some embodiments, a user may write a target word on a paper, and then photographs the target word through a photographing device to obtain the target word image, which is then transmitted from the photographing device to a processing terminal. Alternatively, after the user writes the target word on the paper, a processing terminal having a photographing function may photograph the target word directly, so as to obtain the target word image.

In some other embodiments, the user may write the target word directly on an electronic screen of a processing terminal through an electronic pen, so that the processing terminal may generate the target word image according to a detected touch trajectory on the screen. In addition, in still some other embodiments, the user may also read a pre-stored target word image (which is, for example, transmitted by a third party through a network and is stored in a local memory, or is acquired by photographing at an earlier time and is stored for later use) to acquire the target word image.

In step 102, the target word image is pre-processed to obtain a first processed image and a second processed image.

After the processing terminal acquires the target word image, the processing terminal may cut a target quadrilateral region, i.e., the smallest quadrilateral region comprising the target word, from the target word image, and then perform correction (for example, perspective transformation) on the target quadrilateral region, so as to eliminate a view difference due to the user's photographing angle. After the correction is performed, a skeleton of the target word may be determined, so as to obtain the first processed image comprising the skeleton of the target word. In addition, after the correction is performed, the corrected target quadrilateral region may further be de-noised, so as to obtain the de-noised second processed image. Further, in some other embodiments, other image processing may also be performed on the target word image to obtain the first processed image and the second processed image having different handwriting features.

In step 103, writing feature extraction is performed on the first processed image and the second processed image, to obtain a handwriting feature vector.

After the processing terminal obtains the first processed image comprising the skeleton of the target word and the de-noised second processed image, different feature vectors may be extracted from the first processed image and the second processed image respectively, and the extracted feature vectors are synthesized to obtain a handwriting feature vector comprising different features of the target word.

In step 104, a difference parameter (or equivalently, similarity) between the handwriting feature vector and a reference handwriting feature vector corresponding to a standard word image (or a reference handwriting image) is determined.

After the processing terminal obtains the handwriting feature vector, the difference parameter between the handwriting feature vector and the reference handwriting feature vector corresponding to the standard word image may be determined. Here, a standard word in the standard word image is the same as the target word, for example, if the target word is "地" written by the user, the standard word is "地" stored by the processing terminal as a writing standard. In addition, the reference handwriting feature vector corresponding to the standard word image may be determined in the same manner as that of the handwriting feature vector corresponding to the target word image, and the reference handwriting feature vector may be determined in advance and stored in the processing terminal, or may of course be determined in a process of determining a quality level of the written font, which is not specifically limited in the embodiments of the present disclosure. Further, as described above, in some other embodiments, the standard word image is not necessarily used as an object for determining the similarity, and another image written by, for example, the same writer may be used as the object for determining the similarity. So far, the purpose of determining a handwriting similarity has been achieved by using the method for determining a handwriting similarity, and a next step is an additional optional step for specific application of determining a writing quality level.

In step 105, a writing quality level corresponding to the difference parameter (or similarity) is determined.

The processing terminal may store at least two writing quality levels, and a difference parameter (or similarity) range corresponding to each of the writing quality levels in advance, and after the processing terminal determines the difference parameter between the first feature vector and the second feature vector, the processing terminal may determine a difference parameter range to which the difference parameter belongs, so as to determine a writing quality level corresponding to the difference parameter range, that is, a degree of imitation of the target word relative to the standard word. In practical applications, the smaller the difference parameter between the first feature vector and the second feature vector is, the more similar the target word is to the standard word, that is, the more standard writing the user makes.

In the embodiment of the present disclosure, after the processing terminal acquires the target word image, the processing terminal may firstly pre-process the target word image to obtain the first processed image and the second processed image, and then may perform writing feature extraction on the first processed image and the second processed image to obtain the first feature vector, so as to determine the difference parameter between the first feature vector and the second feature vector corresponding to the standard word image, and determine the writing quality level corresponding to the difference parameter. In the embodiment of the present disclosure, the processing terminal may extract writing features of the target word image and compare the writing features of the target word image with writing features of the standard word image, so as to determine a writing quality level of the target word image relative to the standard word image. In this way, the processing terminal may determine a quality level of a written font of a calligraphy practitioner, so as to provide professional guidance to the calligraphy practitioner, thereby improving the efficiency of the calligraphy practice.

Figure 2:
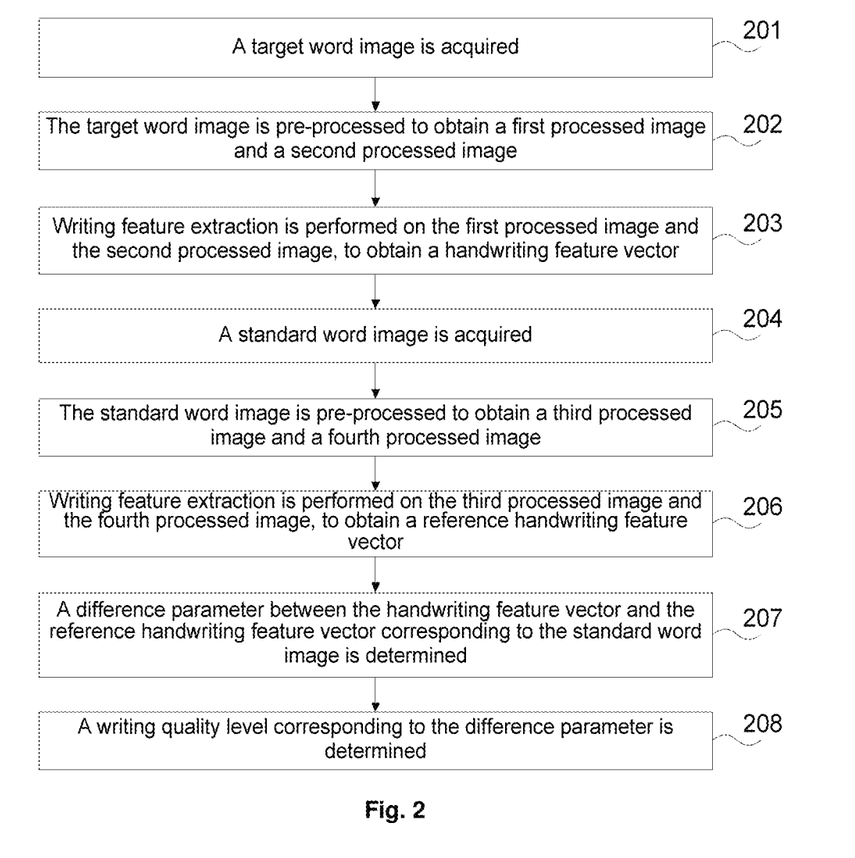
FIG. 2 illustrates a flowchart of steps of a method for determining a quality level of a written font according to another embodiment of the present disclosure.

As shown in FIG. 2, illustrated is a flowchart of steps of a method for determining a quality level of a written font based on a handwriting similarity according to some other embodiments of the present disclosure. The method comprises the following steps.

In step 201, a target word image is acquired.

An implementation of this step is similar to that of step 101 described above, and will not be described in detail herein.

In step 202, the target word image is pre-processed to obtain a first processed image and a second processed image.

In the embodiment of the present disclosure, the step may be implemented by acquiring a target binarized image corresponding to the target word image; determining, in the target binarized image, a target quadrilateral region comprising a target word; performing perspective transformation on the target quadrilateral region to obtain a target corrected region; performing erosion processing on the target corrected region to obtain the first processed image comprising a skeleton of the target word; and de-noising the target corrected region to obtain the second processed image.

In some embodiments, the processing terminal may acquire a target grayscale image corresponding to the target word image, and then may perform binarization processing on the target grayscale image, to obtain the target binarized image. For example, for an 8-bit target grayscale image, binarization processing may be performed on the 8-bit target grayscale image using a threshold of 150. Then, the processing terminal may scan the target binarized image in four directions of upward direction, downward direction, leftward direction, and rightward direction respectively, and when a first pixel is scanned in each direction, a position of a scanning line is recorded, and then a region enclosed by four scanning lines is determined to be the target quadrilateral region comprising the target word. In practical applications, when a user photographs the target word image, a lens is usually difficult to be kept in parallel to a desktop where a paper is located. Therefore, the photographed target word image is actually slightly distorted and may not be used for comparison. Therefore, the processing terminal may perform perspective transformation on the target quadrilateral region to obtain a rectangular target corrected region, thereby eliminating a view difference caused by the user's photographing angle.

Here, the step of performing perspective transformation on the target quadrilateral region by the processing terminal may be known with reference to any existing perspective transformation method, for example, a perspective transformation method based on a Line Segment Detector (LSD), which may firstly perform LSD line detection, then divide pixels into a group of horizontal pixels and a group of vertical pixels, then combine lines which are approximately parallel to each other to determine optimal boundaries and vertices, and perform perspective transformation, and will not be described in detail herein in the embodiments of the present disclosure.

After the processing terminal obtains the target corrected region, the processing terminal may perform two processes on the target corrected region respectively, to obtain two different images having different handwriting features, so as to extract different font features from the two different images. In an implementation, the processing terminal may obtain the first processed image comprising the skeleton of the target word by using the following sub-steps (1) to (5).

In sub-step (1), initial contour points of the target word in the target corrected region are determined, and erosion processing is performed on the initial contour points sequentially using all 3-connected pixel structures, to obtain a first pattern.

In sub-step (2), contour points of the first pattern are determined, and erosion processing is performed on the contour points of the first pattern sequentially using all 4-connected pixel structures, to obtain a second pattern.

In sub-step (3), contour points of the second pattern are determined, and erosion processing is performed on the contour points of the second pattern sequentially using all 5-connected pixel structures, to obtain a third pattern.

In sub-step (4), contour points of the third pattern are determined, and erosion processing is performed on the contour points of the third pattern sequentially using all 6-connected pixel structures, to obtain a four pattern.

In sub-step (5), contour points of the fourth pattern are determined, and erosion processing is performed on the contour points of the fourth pattern sequentially using all 7-connected connected pixel structures, to obtain the first processed image comprising the skeleton of the target word.

Here, the processing terminal may firstly perform preliminary erosion processing on the initial contour points of the target word through small pixel structures, and then sequentially perform further erosion processing on a pattern obtained by previous erosion processing through larger pixel structures, so as to obtain the skeleton of the target word, in which main structural features of the target word are retained. It should be illustrated that the processing terminal may obtain the first processed image comprising the skeleton of the target word in the above implementation, i.e., performing five erosion processes, wherein different pixel structures are used in various erosion processes. Of course, in practical applications, a number of erosion processes and whether the same pixel structures are used in various erosion processes are not specifically limited. For example, three or four erosion processes may be performed, and 3-connected pixel structures are used in each erosion process, etc., which is not specifically limited in the embodiments of the present disclosure.

In addition, after the processing terminal obtains the target corrected region, the processing terminal may perform a first predetermined number of erosion processes on the target corrected region to retain detailed information of the target word, and then perform a second predetermined number of dilation processes on the eroded image to enhance overall information of the target word, so as to achieve de-noising of the target corrected region, to obtain the second processed image.

In step 203, writing feature extraction is performed on the first processed image and the second processed image, to obtain a handwriting feature vector.

In the embodiment of the present disclosure, the present step may be implemented by: extracting writing features of the first processed image and the second processed image to obtain a writing feature vector; and obtaining a handwriting feature vector according to a product of the writing feature vector and preset weights, wherein the writing feature vector may comprise, but not limited to, a style feature vector and at least two of an inner contour feature vector, a perimeter and area feature vector, and an outer contour feature vector.

Specifically, an implementation of the method for extracting writing features of the first processed image and the second processed image to obtain a writing feature vector may comprise:

extracting a font style feature of the second processed image based on a convolutional neural network to obtain the style feature vector, and at least two of:

(2) determining, from the first processed image, an area of a region between a first stroke and a second stroke in at least one preset direction to obtain the inner contour feature vector, (3) determining a font contour perimeter and a font area of the first processed image, to obtain the perimeter and area feature vector, and (4) determining, from the second processed image, an area of a region between an edge of a first target corrected region and the first stroke in at least one preset direction to obtain the outer contour feature vector.

In other words, in the above embodiment, at least one of the inner contour feature vector and the perimeter and area feature vector of the first processed image may be extracted as the first feature vector indicating the first handwriting feature of the target word. Further, in the above embodiment, the font style feature of the second processed image may be extracted, and the outer contour feature vector may be optionally extracted as the second feature vector indicating the second handwriting feature of the target word.

In the above step (1), a trained convolutional neural network for font style classification, such as a VGG-19 model, may be preset in advance in the processing terminal, and then the second processed image may be input into the VGG-19 model, so as to obtain a first output result through a first convolutional layer of the VGG-19 model, obtain a second output result through a second convolutional layer of the VGG-19 model, obtain a third output result through a third convolutional layer of the VGG-19 model, and obtain a fourth output result through a fourth convolutional layer of the VGG-19 model. A four-dimensional vector formed by the four output results is the style feature vector Se1 of the target word. Here, the VGG-19 model in the embodiment of the present disclosure may be constructed and trained with reference to existing methods, for example, methods in the paper "Perceptual Losses for Real-Time Style Transfer and Super-Resolution" etc., and will not be described in detail herein.

It should be illustrated that, since an execution order of the above steps (1) to (4) is not limited, step (1) may be performed after steps (2), (3) and (4). In this case, the processing terminal may input the second processed image and at least two of the inner contour feature vector, the perimeter and area feature vector and the outer contour feature vector into the VGG-19 model as an input set, so as to obtain the style feature vector Se1 of the target word. A data source which is input into the VGG-19 model is not specifically limited in the embodiments of the present disclosure.

Figure 3:
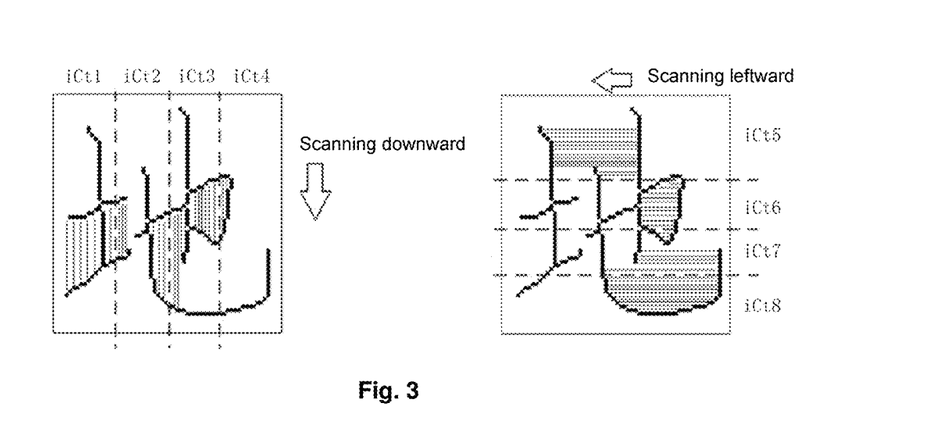
FIG. 3 illustrates a schematic diagram of scanning a first processed image downward and leftward according to another embodiment of the present disclosure.

In the above step (2), the at least one preset direction may comprise four directions of upward direction, downward direction, leftward direction, and rightward direction, and the processing terminal may scan the first processed image in the four directions of upward direction, downward direction, leftward direction, and rightward direction, respectively, and calculate an area of a region which is enclosed by a first stroke, a second stroke, and scanning lines corresponding to a time when the first stroke is passed through and a time when the second stroke is reached. In practical applications, the first processed image may be equally divided into four scanning regions along a scanning direction when scanning is performed each time. As shown in FIG. 3, when scanning is performed downward, the first processed image may be divided into four scanning regions iCt1, iCt2, iCt3, and iCt4 along a scanning direction; and when scanning is performed leftward, the first processed image may be divided into four scanning regions iCt5, iCt6, iCt7 and iCt8 along a scanning direction. Thereby, after the scanning processes are completed, area values of four sub-regions may be obtained in each preset direction, and area values of a total of 16 sub-regions are obtained in four preset directions, that is, a 16-dimensional inner contour feature vector Se2 of the target word may be obtained, and the inner contour feature vector may represent internal structure information of the target word. Of course, in step (2), the scanning directions are not limited to the four directions of upward direction, downward direction, leftward direction, and rightward direction.

In the above step (3), the processing terminal may determine a font contour of the target word in the first processed image by using a cvFindContours function such as OpenCV, and then determine a font contour perimeter by using a cvArcLength function, and the processing terminal may further determine an area enclosed by the font contour, that is, a font area of the target word, by using a cvContourArea function, so as to obtain a 2-dimensional perimeter and area feature vector Se3.

Figure 4:
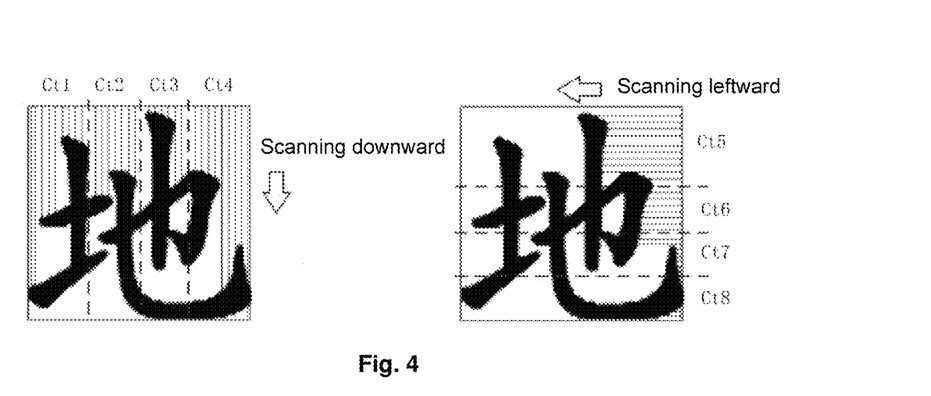
FIG. 4 illustrates a schematic diagram of scanning a second processed image downward and leftward according to another embodiment of the present disclosure.

In the above step (4), the edge of the first target corrected region is a first edge in the target corrected region along a preset direction. For example, when scanning is performed downward, the edge of the first target corrected region is an upper edge of the target corrected region, and when scanning is performed leftward, the edge of the first target corrected region is a right edge of the target corrected region. The processing terminal may perform scanning in four directions of upward direction, downward direction, leftward direction, and rightward direction respectively, and calculate an area of a region which is enclosed by an edge of a first target corrected region corresponding to each direction, the first stroke, and scanning lines corresponding to a time when the edge of the first target corrected region is passed through and a time when the first stroke is reached. In practical applications, the second processed image may be equally divided into four scanning regions along a scanning direction when scanning is performed each time. As shown in FIG. 4, when scanning is performed downward, the second processed image may be divided into four scanning regions Ct1, Ct2, Ct3, and Ct4 along a scanning direction; and when scanning is performed leftward, the second processed image may be divided into four scanning regions Ct5, Ct6, Ct7 and Ct8 along a scanning direction. Thereby, after the scanning processes are completed, area values of four sub-regions may be obtained in each preset direction, and area values of a total of 16 sub-regions are obtained in four preset directions, that is, a 16-dimensional outer contour feature vector Se4 of the target word may be obtained, and the outer contour feature vector may represent external structure information of the target word. Of course, in step (4), the scanning directions are not limited to the four directions of upward direction, downward direction, leftward direction, and rightward direction.

In addition, an implementation of obtaining a handwriting feature vector according to a product of the writing feature vector and preset weights may comprise: calculating a first product of the style feature vector and a first preset weight, and at least two of a second product of the inner contour feature vector and a second preset weight, a third product of the perimeter and area feature vector and a third preset weight, and a fourth product of the outer contour feature vector and a fourth preset weight, and adding the at least two of the second product, the third product, and the four product to the first product to obtain the handwriting feature vector.

Here, different writing feature vectors of the target word may be given different weights. For example, the style feature vector Se1 of the target word corresponds to a first preset weight Re1, the inner contour feature vector Se2 of the target word corresponds to a second preset weight Re2, the perimeter and area feature vector Se3 of the target word corresponds to a third preset weight Re3, and the outer contour feature vector Se4 of the target word corresponds to a fourth preset weight Re4, wherein various weights should satisfy a condition that a sum of the first preset weight, the second preset weight, the third preset weight, and the fourth preset weight is 1. When all the four writing feature vectors are included, the handwriting feature vector of the target word is $Ye=Se1*Re1+Se2*Re2+Se3*Re3+Se4*Re4$.

In a specific application, the first preset weight, the second preset weight, the third preset weight, and the fourth preset weight may be obtained by fitting a plurality of groups of known style feature vectors and corresponding handwriting feature vectors. Here, the plurality of groups of known style feature vectors and corresponding handwriting feature vectors may be obtained by calibrating a plurality of groups of handwritten target word images.

In step 204, a standard word image is acquired.

In the embodiment of the present disclosure, a large number of images as standard words to be imitated may be stored in advance in the processing terminal, then the target word in the target word image may be identified, then a standard word corresponding to the target word is determined, and then a standard word image corresponding to the target word is selected from the stored various images as standard words to be imitated. Of course, in another implementation, a user may manually select a standard word image corresponding to the target word from various images as standard words to be imitated before inputting the standard word image into the processing terminal. Of course, the user may also photograph the standard word image corresponding to the target word, which is not specifically limited in the embodiments of the present disclosure.

In step 205, the standard word image is pre-processed to obtain a third processed image and a fourth processed image.

In the embodiment of the present disclosure, the implementation of the step is similar to that of pre-processing the target word image in step 202, and may comprise: acquiring a standard binarized image corresponding to the standard word image; determining, in the standard binarized image, a standard quadrilateral region comprising the standard word; performing perspective transformation on the standard quadrilateral region to obtain a standard corrected region; performing erosion processing on the standard corrected region to obtain the third processed image comprising a skeleton of the standard word; and de-noising the standard corrected region to obtain the fourth processed image.

Here, in the process of performing perspective transformation on the standard quadrilateral region, not only a distorted viewing angle of the standard quadrilateral region may be corrected, but also the standard quadrilateral region may be transformed to have the same size as that of the target corrected region. Of course, in practical applications, the target corrected region may also be transformed to have the same size as that of the standard quadrilateral region, which is not specifically limited in the embodiments of the present disclosure.

In step 206, writing feature extraction is performed on the third processed image and the fourth processed image, to obtain a reference handwriting feature vector.

In the embodiment of the present disclosure, the implementation of this step is similar to that of performing writing feature extraction on the first processed image and the second processed image in step 203, and may comprise: obtaining a style feature vector of the standard word from the fourth processed image, obtaining an inner contour feature vector of the standard word from the third processed image, obtaining a perimeter and area feature vector of the standard word from the third processed image, and obtaining an outer contour feature vector of the standard word from the fourth processed image.

Here, a preset weight corresponding to each writing feature vector of the target word may be different from that corresponding to each writing feature vector of the standard word. For example, the style feature vector Ss1 of the standard word corresponds to a fifth preset weight Rs1, the inner contour feature vector Ss2 of the standard word corresponds to a sixth preset weight Rs2, the perimeter and area feature vector Ss3 of the standard word corresponds to a seventh preset weight Rs3, and the outer contour feature vector Ss4 of the standard word corresponds to an eighth preset weight Rs4, wherein various weights should satisfy a condition that a sum of the fifth preset weight, the sixth preset weight, the seventh preset weight, and the eighth preset weight is 1. When all the four writing feature vectors are included, the reference handwriting feature vector of the standard word is $Ys=Ss1*Rs1+Ss2*Rs2+Ss3*Rs3+Ss4*Rs4$.

In a specific application, the fifth preset weight, the sixth preset weight, the seventh preset weight, and the eighth preset weight may be obtained by fitting a plurality of groups of known style feature vectors and corresponding reference handwriting feature vectors. Here, the plurality of groups of known style feature vectors and corresponding reference handwriting feature vectors may be obtained by calibrating a plurality of groups of standard word images.

It should be illustrated that, in practical applications, step 204 to step 206 may be performed after step 203, or may be performed before step 201, or step 201 and step 204 may be performed at the same time, step 202 and step 205 may be performed at the same time, and step 203 and step 206 may be performed at the same time, which is not limited specifically in the embodiments of the present disclosure.

In step 207, a difference parameter (or similarity) between the handwriting feature vector and the reference handwriting feature vector corresponding to the standard word image is determined.

In a specific application, the difference parameter may comprise a Euclidean distance or a Mahalanobis distance. For example, the processing terminal may determine a Euclidean distance d=|Ys−Ye| between the first feature vector Ye and the second feature vector Ys corresponding to the standard word image. Further, in some embodiments, the similarity may be given based on the difference parameter. For example, the similarity may be a reciprocal of the difference parameter, a cosine similarity between feature vectors, or a Jaccard similarity between sets, etc., and the present disclosure is not limited thereto.

In step 208, a writing quality level corresponding to the difference parameter is determined.

By taking the difference parameter being a Euclidean distance as an example, the processing terminal may store four writing quality levels, i.e., "excellent", "good", "general" and "poor", and Euclidean distance ranges corresponding to various writing quality levels in advance. After the processing terminal determines a Euclidean distance d between a first feature vector and a second feature vector, a Euclidean distance range D1 to which the Euclidean distance d belongs may be determined, and thereby a writing quality level corresponding to the Euclidean distance range D1 is determined to be "excellent", which indicates that the target word is very similar to the standard word, that is, the user writes a quite standard target word. In some other embodiments, the writing quality level may also be determined according to the similarity, which will not be described in detail here due to an intuitive negative correlation relationship between the distance (difference) parameter and the similarity.

In the embodiment of the present disclosure, after the processing terminal acquires the target word image, the processing terminal may firstly pre-process the target word image to obtain the first processed image and the second processed image, then perform writing feature extraction on the first processed image and the second processed image, to obtain the handwriting feature vector, and then may determine the reference handwriting feature vector corresponding to the standard word image, so as to determine the difference parameter or similarity between the handwriting feature vector and the reference handwriting feature vector, and determine the writing quality level corresponding to the difference parameter or similarity. In the embodiment of the present disclosure, the processing terminal may extract writing features of the target word image and compare the writing features of the target word image with writing features of the standard word image, so as to determine a writing quality level of the target word image relative to the standard word image. In this way, the processing terminal may determine a quality level of a written font of a calligraphy practitioner, so as to provide professional guidance to the calligraphy practitioner, thereby improving the efficiency of the calligraphy practice.

Figure 5:
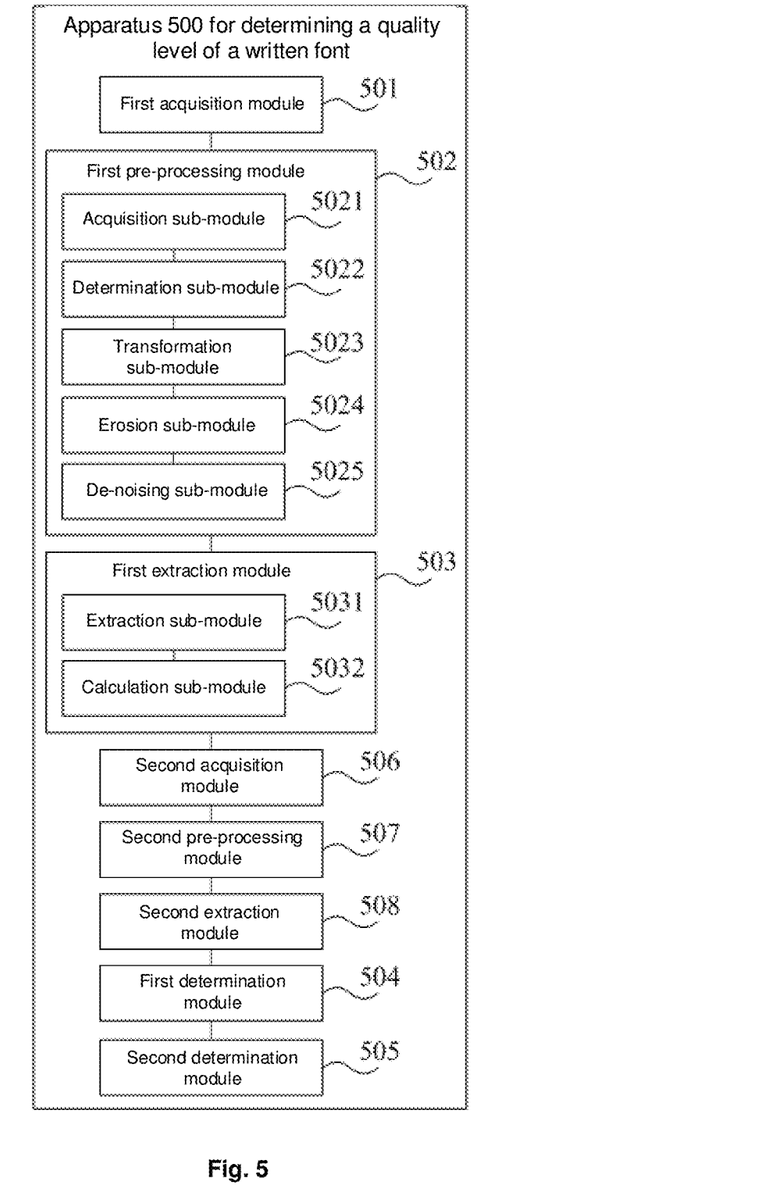
FIG. 5 illustrates a schematic structural diagram of an apparatus for determining a quality level of a written font according to still another embodiment of the present disclosure.

FIG. 5 illustrates a schematic structural diagram of an apparatus for determining a quality level of a written font based on a handwriting similarity according to still another embodiment of the present disclosure. As shown in FIG. 5, the apparatus 500 may comprise:

a first acquisition module 501, configured to acquire a target word image;

a first pre-processing module 502, configured to pre-process the target word image to obtain a first processed image and a second processed image;

a first extraction module 503, configured to perform writing feature extraction on the first processed image and the second processed image, to obtain a handwriting feature vector;

a first determination module 504, configured to determine a difference parameter between the handwriting feature vector and a reference handwriting feature vector corresponding to a standard word image; and a second determination module 505, configured to determine a writing quality level corresponding to the difference parameter.

In some embodiments, as shown in FIG. 5, the apparatus 500 further comprises:

a second acquisition module 506, configured to acquire the standard word image;

a second pre-processing module 507, configured to pre-process the standard word image to obtain a third processed image and a fourth processed image; and a second extraction module 508, configured to perform writing feature extraction on the third processed image and the fourth processed image, to obtain a reference handwriting feature vector.

In some embodiments, as shown in FIG. 5, the first pre-processing module 502 comprises:

an acquisition sub-module 5021, configured to acquire a target binarized image corresponding to the target word image;

a determination sub-module 5022, configured to determine, in the target binarized image, a target quadrilateral region comprising a target word;

a transformation sub-module 5023, configured to perform perspective transformation on the target quadrilateral region to obtain a target corrected region;

an erosion sub-module 5024, configured to perform erosion processing on the target corrected region to obtain the first processed image comprising a skeleton of the target word; and a de-noising sub-module 5025, configured to de-noise the target corrected region to obtain the second processed image.

In some embodiments, as shown in FIG. 5, the first extraction module 503 comprises:

an extraction sub-module 5031, configured to perform writing feature extraction on the first processed image and the second processed image to obtain a writing feature vector;

a calculation sub-module 5032, configured to obtain the handwriting feature vector according to a product of the writing feature vector and preset weights.

Here, the writing feature vector comprises a style feature vector and at least two of an inner contour feature vector, a perimeter and area feature vector, and an outer contour feature vector.

Figure 6:
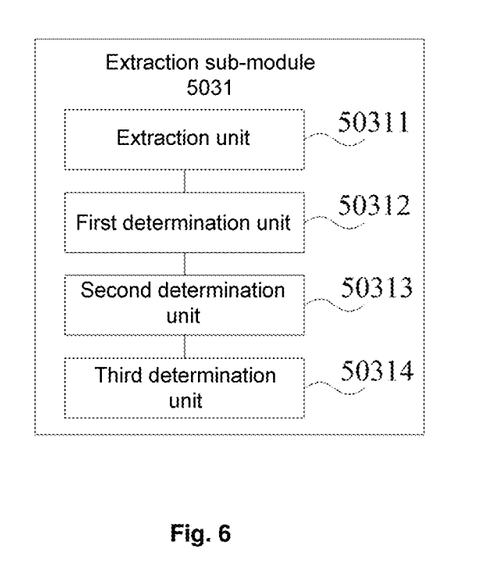
FIG. 6 illustrates a schematic structural diagram of an extraction sub-module according to still another embodiment of the present disclosure.

In some embodiments, as shown in FIG. 6, the extraction sub-module 5031 comprises:

an extraction unit 50311, configured to extract a font style feature of the second processed image based on a convolutional neural network, to obtain the style feature vector; and at least two of:

a first determination unit 50312, configured to determine, from the first processed image, an area of a region between a first stroke and a second stroke in at least one preset direction, to obtain the inner contour feature vector;

a second determination unit 50313, configured to determine a font contour perimeter and a font area of the first processed image, to obtain the perimeter and area feature vector;

a third determination unit 50314, configured to determine, from the second processed image, an area of a region between an edge of a first target corrected region and the first stroke in at least one preset direction to obtain the outer contour feature vector.

In the embodiment of the present disclosure, after the processing terminal acquires the target word image through the first acquisition module, the processing terminal may firstly pre-process the target word image through the first pre-processing module to obtain the first processed image and the second processed image, and then perform writing feature extraction on the first processed image and the second processed image through the first extraction module to obtain the handwriting feature vector, so as to determine the difference parameter between the handwriting feature vector and the reference handwriting feature vector corresponding to the standard word image through the first determination module, and determine the writing quality level corresponding to the difference parameter through the second determination module. In the embodiment of the present disclosure, the processing terminal may extract writing features of the target word image and compare the writing features of the target word image with writing features of the standard word image, so as to determine a writing quality level of the target word image relative to the standard word image. In this way, the processing terminal may determine a quality level of a written font of a calligraphy practitioner, so as to provide professional guidance to the calligraphy practitioner, thereby improving the efficiency of the calligraphy practice.

Figure 7:
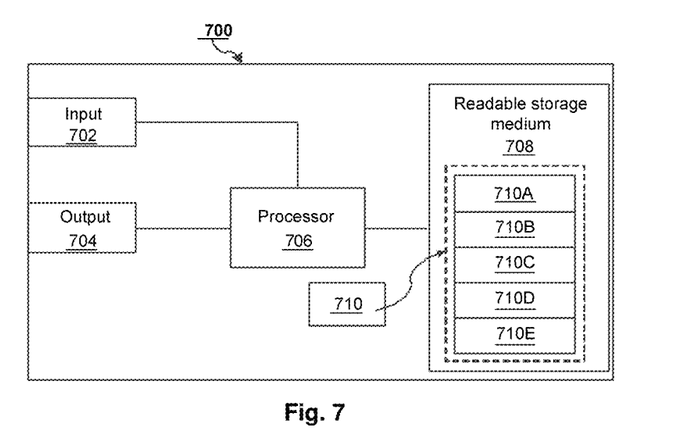
FIG. 7 illustrates a hardware arrangement diagram of a device for determining a handwriting similarity according to an embodiment of the present disclosure.

FIG. 7 is schematic diagram of a hardware arrangement 700 for determining a handwriting similarity according to an embodiment of the present disclosure. The hardware arrangement 700 comprises a processor 706 (for example, a Digital Signal Processor (DSP), a Central Processing Unit (CPU), etc.) The processor 706 may be a single processing unit or a plurality of processing units for performing different actions of the flow described herein. The arrangement 700 may also comprise an input unit 702 for receiving signals from other entities, and an output unit 704 for providing signals to other entities. The input unit 702 and the output unit 704 may be arranged as a single entity or separate entities.

In addition, the arrangement 700 may comprise at least one readable storage medium 708 in a form of non-volatile or volatile memory, such as an Electrically Erasable Programmable Read-Only Memory (EEPROM), a flash memory, and/or a hard disk driver. The readable storage medium 708 comprises a computer program 710 which includes codes/computer readable instructions that, when executed by the processor 706 in the arrangement 700, cause the hardware arrangement 700 and/or the device including the hardware arrangement 700 to perform, for example, flows described above in connection with FIG. 1 or 2 and any variations thereof.

The computer program 710 may be configured with computer program codes having, for example, architecture of computer program modules 710A-710E. Therefore, in an example embodiment when the hardware arrangement 700 is used in the mobile terminal, the codes in the computer program of the arrangement 700 may comprise a module 710A for performing image processing on a handwriting image comprising a handwriting to be compared to obtain a first processed image and a second processed image having different writing features of the handwriting image; a module 710B for determining, based on the first processed image, a first feature vector indicating at least one first handwriting feature of the handwriting to be compared; a module 710C for determining, based on the second processed image, a second feature vector indicating at least one second handwriting feature of the handwriting to be compared; a module 710D for determining a handwriting feature vector of the handwriting to be compared based at least on the first feature vector and the second feature vector; and a module 710E for determining a similarity between the handwriting to be compared and a reference handwriting based on the handwriting feature vector and a reference handwriting feature vector of the reference handwriting . . . .

The computer program modules may substantially perform the various actions in the flow shown in FIG. 1 or 2 to simulate the device for determining a handwriting similarity. In other words, when different computer program modules are executed in the processor 706, they may correspond to different units or modules in the device for determining a handwriting similarity.

Although the code means in the embodiments disclosed above in conjunction with FIG. 7 are implemented as computer program modules that, when executed in the processor 706, cause the hardware arrangement 700 to perform the actions described above in connection with FIG. 1 or 2, in alternative embodiments, at least one of the code means may be implemented at least in part as a hardware circuit.

The processor may be a single Central Processing Unit (CPU), but may also comprise two or more processing units. For example, the processor may comprise a general purpose microprocessor, an instruction set processor, and/or a related chipset and/or a dedicated microprocessor (for example, an Application Specific Integrated Circuit (ASIC)). The processor may also comprise an on-board memory for caching purposes. The computer program may be carried by a computer program product connected to the processor. The computer program product may comprise a computer-readable medium having stored thereon a computer program. For example, the computer program product may be a flash memory, a Random Access Memory (RAM), a Read Only Memory (ROM), and an EEPROM, and the computer program module may, in an alternative embodiment, be distributed to different computer program products in a form of memory within the device.

For the above method embodiments, for the sake of brevity, they are all described as combinations of a series of actions, but it should be understood by those skilled in the art that the present disclosure is not limited by an order of actions described, since according to the present disclosure, some steps may be performed in other orders or at the same time. In addition, it should also be understood by those skilled in the art that the embodiments described in the present specification are all preferred embodiments, and actions and modules involved are not necessarily required by the present disclosure.

Various embodiments in the present specification are described in a progressive manner, each embodiment focuses on differences from other embodiments, and the same or similar parts between the various embodiments may be known with reference to each other.

Finally, it should also be illustrated that relational terms such as "first", "second" etc. herein are merely used to distinguish one entity or operation from another entity or operation, and do not necessarily require or imply that there is any such actual relationship or order between these entities or operations. Further, the terms "comprises" or "comprising" or any other variations thereof are intended to encompass a non-exclusive inclusion, so that a process, method, commodity, or device comprising a series of elements not only comprises these elements, but also comprises other elements which are not explicitly listed, or may further comprise elements inherent to such a process, method, commodity, or device. Unless otherwise restricted, an element defined by a phrase "comprising a . . . " does not exclude the presence of additional equivalent elements in a process, method, commodity, or device comprising the element.

The method, device, and non-transitory computer readable storage medium for determining a handwriting similarity according to the present disclosure have been described in detail above. Specific examples are applied herein to explain the principles and implementations of the present disclosure. The above description of the embodiments is only for facilitating understanding the method according to the present disclosure and its core idea; at the same time, changes may be made to the specific implementations and application scopes by those of ordinary skill in the art according to the idea of the present disclosure. In conclusion, the contents of the present specification are not to be construed as limiting the present disclosure.

I claim:

1. A computer implemented method for determining a handwriting similarity, the method comprising:
    performing image processing on a handwriting image comprising a handwriting to be compared to obtain a first processed image and a second processed image having different handwriting features of the handwriting image;
    determining, based on the first processed image, a first feature vector indicating at least one first handwriting feature of the handwriting to be compared;
    determining, based on the second processed image, a second feature vector indicating at least one second handwriting feature of the handwriting to be compared;
    determining a handwriting feature vector of the handwriting to be compared based at least on the first feature vector and the second feature vector; and
    determining a similarity between the handwriting to be compared and a reference handwriting based on the handwriting feature vector and a reference handwriting feature vector of the reference handwriting.

2. The method according to claim 1, wherein the step of determining a similarity between the handwriting to be compared and a reference handwriting based on the handwriting feature vector and a reference handwriting feature vector of the reference handwriting comprises:
    determining a distance parameter between the handwriting feature vector and the reference handwriting feature vector; and
    determining the similarity between the handwriting to be compared and the reference handwriting based on the distance parameter.

3. The method according to claim 2, wherein the distance parameter comprises a Euclidean distance or a Mahalanobis distance between the vectors.

4. The method according to claim 1, wherein the reference handwriting feature vector of the reference handwriting is determined by:
    performing image processing on the reference handwriting image comprising the reference handwriting to obtain a third processed image and a fourth processed image having different handwriting features of the reference handwriting image;
    determining, based on the third processed image, a third feature vector indicating a corresponding first handwriting feature of the reference handwriting;
    determining, based on the fourth processed image, a fourth feature vector indicating a corresponding second handwriting feature of the reference handwriting; and
    determining a reference handwriting feature vector of the reference handwriting based at least on the third feature vector and the fourth feature vector.

5. The method according to claim 1, wherein the step of performing image processing on a handwriting image comprising a handwriting to be compared to obtain a first processed image and a second processed image having different handwriting features of the handwriting image comprise:
    converting the handwriting image into a corresponding binarized handwriting image;
    determining, in the binarized handwriting image, a quadrilateral region comprising the handwriting to be compared;
    performing perspective transformation on the quadrilateral region to obtain a corrected region;
    performing erosion processing on the corrected region to obtain the first processed image comprising a skeleton of the handwriting to be compared; and
    de-noising the corrected region to obtain the second processed image.

6. The method according to claim 1, wherein the step of determining a handwriting feature vector of the handwriting to be compared based at least on the first feature vector and the second feature vector comprises:
    determining a weighted sum of the first feature vector and the second feature vector based on preset weights, as the handwriting feature vector.

7. The method according to claim 6, wherein the first feature vector comprises at least one of an inner contour feature vector and a perimeter and area feature vector.

8. The method according to claim 6, wherein the second feature vector comprises at least one of an outer contour feature vector and a style feature vector.

9. The method according to claim 7, wherein the step of determining, based on the first processed image, a first feature vector indicating at least one first handwriting feature of the handwriting to be compared comprises at least one of:
    determining, from the first processed image, an area of a region between a first stroke and a second stroke in at least one preset direction as the inner contour feature vector; or determining a font contour perimeter and a font area of the first processed image to obtain the perimeter and area feature vector.

10. The method according to claim 8, wherein the step of determining, based on the second processed image, a second feature vector indicating at least one second handwriting feature of the handwriting to be compared comprises at least one of:
extracting a font style feature of the second processed image based on a convolutional neural network to obtain the style feature vector; or
determining, from the second processed image, an area of a region between an edge of a first target corrected region and a first stroke in at least one of the preset directions to obtain the outer contour feature vector.

11. A device for determining a handwriting similarity, the device comprising:
a processor; and
a memory having stored thereon instructions which, when executed by the processor, cause the processor to:
perform image processing on a handwriting image comprising a handwriting to be compared to obtain a first processed image and a second processed image having different handwriting features of the handwriting image;
determine, based on the first processed image, a first feature vector indicating at least one first handwriting feature of the handwriting to be compared;
determine, based on the second processed image, a second feature vector indicating at least one second handwriting feature of the handwriting to be compared;
determine a handwriting feature vector of the handwriting to be compared based on the first feature vector and the second feature vector at least; and
determine a similarity between the handwriting to be compared and a reference handwriting based on the handwriting feature vector and a reference handwriting feature vector of the reference handwriting.

12. The device according to claim 11, wherein the instructions, when executed by the processor, further cause the processor to:
determine a distance parameter between the handwriting feature vector and the reference handwriting feature vector; and
determine the similarity between the handwriting to be compared and the reference handwriting based on the distance parameter.

13. The device according to claim 12, wherein the distance parameter comprises a Euclidean distance or a Mahalanobis distance between the vectors.

14. The device according to claim 11, wherein the instructions, when executed by the processor, further cause the processor to:
perform image processing on the reference handwriting image comprising the reference handwriting to obtain a third processed image and a fourth processed image having different handwriting features of the reference handwriting image;
determine, based on the third processed image, a third feature vector indicating a corresponding first handwriting feature of the reference handwriting;
determine, based on the fourth processed image, a fourth feature vector indicating a corresponding second handwriting feature of the reference handwriting; and
determine a reference handwriting feature vector of the reference handwriting based at least on the third feature vector and the fourth feature vector.

15. The device according to claim 11, wherein the instructions, when executed by the processor, further cause the processor to:
convert the handwriting image into a corresponding binarized handwriting image;
determine, in the binarized handwriting image, a quadrilateral region comprising the handwriting to be compared;
perform perspective transformation on the quadrilateral region to obtain a corrected region;
perform erosion processing on the corrected region to obtain the first processed image comprising a skeleton of the handwriting to be compared; and
de-noise the corrected region to obtain the second processed image.

16. The device according to claim 11, wherein the instructions, when executed by the processor, further cause the processor to:
determine a weighted sum of the first feature vector and the second feature vector based on preset weights, as the handwriting feature vector.

17. The device according to claim 16, wherein the first feature vector comprises at least one of an inner contour feature vector and a perimeter and area feature vector.

18. The device according to claim 16, wherein the second feature vector comprises at least one of an outer contour feature vector and a style feature vector.

19. The device according to claim 17, wherein the instructions, when executed by the processor, further cause the processor to perform at least one of:
determining, from the first processed image, an area of a region between a first stroke and a second stroke in at least one preset direction as the inner contour feature vector; or
determining a font contour perimeter and a font area of the first processed image to obtain the perimeter and area feature vector.

20. A non-transitory computer readable storage medium, having stored thereon a computer program which, when executed by a processor, implements the steps of the method according to claim 1.

* * * * *